United States Patent
Lawson

(10) Patent No.: US 11,280,680 B1
(45) Date of Patent: Mar. 22, 2022

(54) HEAT DETECTION SYSTEM

(71) Applicant: Richard Alvin Lawson, Monaca, PA (US)

(72) Inventor: Richard Alvin Lawson, Monaca, PA (US)

( * ) Notice: Subject to any disclaimer, the term of this patent is extended or adjusted under 35 U.S.C. 154(b) by 0 days.

(21) Appl. No.: 16/722,483

(22) Filed: Dec. 20, 2019

Related U.S. Application Data

(63) Continuation-in-part of application No. 16/554,193, filed on Aug. 28, 2019, which is a continuation-in-part of application No. 16/516,706, filed on Jul. 19, 2019.

(51) Int. Cl.
| | |
|---|---|
| *G01K 1/16* | (2006.01) |
| *F28F 21/08* | (2006.01) |
| *F28F 9/013* | (2006.01) |
| *F28F 9/02* | (2006.01) |
| *F24T 10/13* | (2018.01) |
| *G01V 9/00* | (2006.01) |
| *F28F 9/00* | (2006.01) |

(52) U.S. Cl.
CPC ............... *G01K 1/16* (2013.01); *F24T 10/13* (2018.05); *G01V 9/005* (2013.01); *F28F 9/005* (2013.01); *F28F 9/0131* (2013.01); *F28F 9/0219* (2013.01); *F28F 21/081* (2013.01)

(58) Field of Classification Search
CPC .. G01J 5/00; F28F 9/005; F28F 9/0131; F28F 9/0219; F28F 9/0246; F28F 21/081; G01K 1/16; G01V 9/005
USPC ........................................................ 165/185
See application file for complete search history.

(56) References Cited

U.S. PATENT DOCUMENTS

| | | | | |
|---|---|---|---|---|
| 1,597,720 | A * | 8/1926 | Carrier ................ | F28D 1/05333 165/149 |
| 4,227,570 | A * | 10/1980 | Crews ...................... | F01P 11/08 165/140 |
| 4,484,621 | A * | 11/1984 | Kuchelmeister .... | F28D 1/05333 165/149 |
| 4,596,285 | A * | 6/1986 | Dinulescu ............... | F28F 3/083 165/166 |
| 5,450,896 | A * | 9/1995 | Bertva .................... | F28F 9/002 165/153 |
| 7,640,966 | B2 * | 1/2010 | Maeda .................... | F28F 9/002 165/41 |
| 7,854,254 | B2 * | 12/2010 | Howard ................. | F28F 9/0219 165/158 |
| 9,664,144 | B2 * | 5/2017 | Vallee .............. | F02M 35/10327 |
| 2011/0290464 | A1 * | 12/2011 | Mabes .................... | B23P 15/26 165/173 |
| 2018/0156542 | A1 * | 6/2018 | Kolb ..................... | F28D 1/0417 |

* cited by examiner

*Primary Examiner* — Paul Alvare
(74) *Attorney, Agent, or Firm* — Ference & Associates LLC

(57) ABSTRACT

One embodiment provides a heat conveyance module, including: a top plate, the top plate including an opening; at least two side plates, wherein each of the two side plates is mechanically coupled to a bottom face of the top plate; at least one pole coupled to the top plate, the at least one pole having an interior opening, wherein the lengthwise dimension of the at least one pole is perpendicular to the lengthwise dimension of the top plate; and at least one tamper detection device placed within the interior opening of the at least one pole.

14 Claims, 4 Drawing Sheets

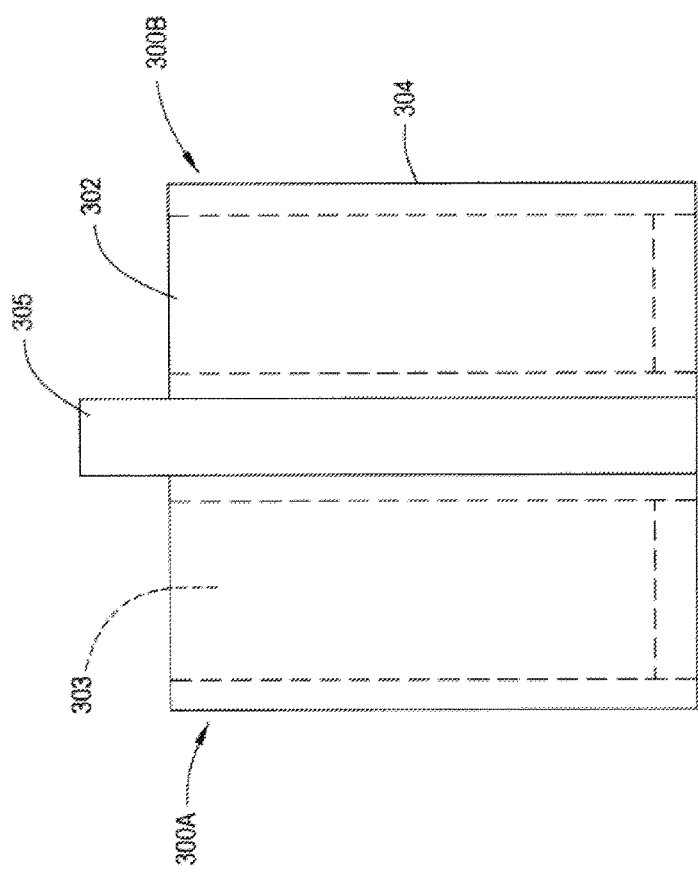
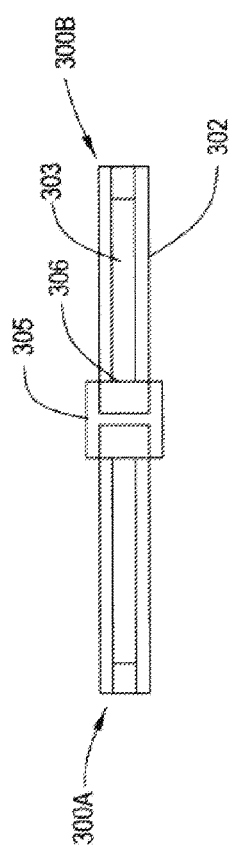
FIG. 4A
FIG. 4B

HEAT DETECTION SYSTEM

CROSS-REFERENCE TO RELATED APPLICATIONS

This application is a continuation-in-part of U.S. patent application Ser. No. 16/554,193, entitled "HEAT DETECTION SYSTEM," filed on Aug. 28, 2019, which is a continuation-in-part of U.S. patent application Ser. No. 16/516,706, entitled "HEAT DETECTION SYSTEM," filed on Jul. 19, 2019, all of which the contents of which are incorporated by reference herein.

BACKGROUND

To detect people, animals, or other heat producing objects at a distance, in the dark, behind other objects, or the like, a user may employ a heat detection system. For example, a person may use a thermal imaging camera to detect heat produced by a person. Typically the heat detection system includes a display or connects to a computer or other electronic device with a display. The heat detection system outputs an image of the different heat signatures produced by objects within the "view" of the heat detection system. This allows a user to see the different objects as heat signatures and thereby identify different objects located at a distance away.

Since different objects produce different heat signatures, a user viewing the display provided by the heat detection system can identify types and locations of different objects. Better heat detection systems provide more accurate details, thereby allowing the user to detect smaller heat producing objects and/or more accurate object shapes allowing the user to identify the exact type of object that is producing the heat. Since the heat detection system detects a difference in temperatures between adjacent objects, the heat detection system may be used to detect other than live objects that produce heat. For example, a metal object heated by the sun may be displayed on the heat detection system as having a warmer heat signature than an adjacent object.

BRIEF SUMMARY

In summary, one aspect of the invention provides a heat conveyance system, comprising: at least one heat conveyance module, comprising: a top plate having a length dimension, a width dimension, and a depth dimension, wherein the length dimension is greater than the width dimension, the top plate comprising an opening; at least two side plates, wherein each of the two side plates is mechanically coupled to a bottom face of the top plate in a lengthwise direction and wherein, when mechanically coupled, the at least two side plates are in a perpendicular direction with respect to the top plate and have a space between the at least two side plates; and at least three sealing pieces located between and mechanically coupled to two adjacent side plates, wherein at least one sealing piece is located at a left side of the adjacent side plates, at least one sealing piece is located at a right side of the adjacent side plates, and at least one sealing piece is located at a bottom side of the adjacent side plates; at least one pole coupled to the at least one heat conveyance module, the at least one pole having an interior opening, wherein the lengthwise dimension of the at least one pole is perpendicular to the lengthwise dimension of the top plate; and at least one tamper detection device placed within the interior opening of the at least one pole.

Another aspect of the invention provides a heat conveyance module, comprising: a top plate having a length dimension, a width dimension, and a depth dimension, wherein the length dimension is greater than the width dimension, the top plate comprising an opening; at least two side plates, wherein each of the two side plates is mechanically coupled to a bottom face of the top plate in a lengthwise direction and wherein, when mechanically coupled, the at least two side plates are in a perpendicular direction with respect to the top plate and have a space between the at least two side plates; at least three sealing pieces located between and mechanically coupled to two adjacent side plates, wherein at least one sealing piece is located at a left side of the adjacent side plates, at least one sealing piece is located at a right side of the adjacent side plates, and at least one sealing piece is located at a bottom side of the adjacent side plates; at least one pole coupled to the top plate, the at least one pole having an interior opening, wherein the lengthwise dimension of the at least one pole is perpendicular to the lengthwise dimension of the top plate; and at least one tamper detection device placed within the interior opening of the at least one pole.

An additional aspect of the invention provides a A heat conveyance system, comprising: two heat conveyance modules, each heat conveyance module comprising: a top plate having a length dimension, a width dimension, and a depth dimension, wherein the length dimension is greater than the width dimension, the top plate comprising an opening; at least two side plates, wherein each of the two side plates is mechanically coupled to a bottom face of the top plate in a lengthwise direction and wherein, when mechanically coupled, the at least two side plates are in a perpendicular direction with respect to the top plate and have a space between the at least two side plates; and at least three sealing pieces located between and mechanically coupled to two adjacent side plates, wherein at least one sealing piece is located at a left side of the adjacent side plates, at least one sealing piece is located at a right side of the adjacent side plates, and at least one sealing piece is located at a bottom side of the adjacent side plates; the at least three sealing pieces and the top plate act to seal the outer perimeter of the at least two side plates such that heat introduced into the space between the at least two side plates is directed to the opening of the top plate; wherein the two heat conveyance modules are adjacent to each other with respect to the width dimension of the top plate and such that the opening of the top plate of one heat conveyance module is located proximate to the opening of the top plate of the other heat conveyance module; at least one air conveyance device coupled to a top face of both of the top plates of the two heat conveyance modules such that the inner opening of the air conveyance device covers the opening of both of the heat conveyance modules and the length of the at least one air conveyance device being in a perpendicular direction with respect to a top face of the top plates; a plurality of poles mechanically coupled to a top face of the top plate of each of the heat conveyance modules, the length of the plurality of poles being in a perpendicular direction with respect to the top face of the top plate; and at least one tamper detection device placed within the interior opening of each of the plurality of poles.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

BRIEF DESCRIPTION OF THE SEVERAL VIEWS OF THE DRAWINGS

FIG. 4A illustrates a front view of an example heat conveyance system.

FIG. 4B illustrates a top view of an example heat conveyance system.

DETAILED DESCRIPTION

Figure 1:
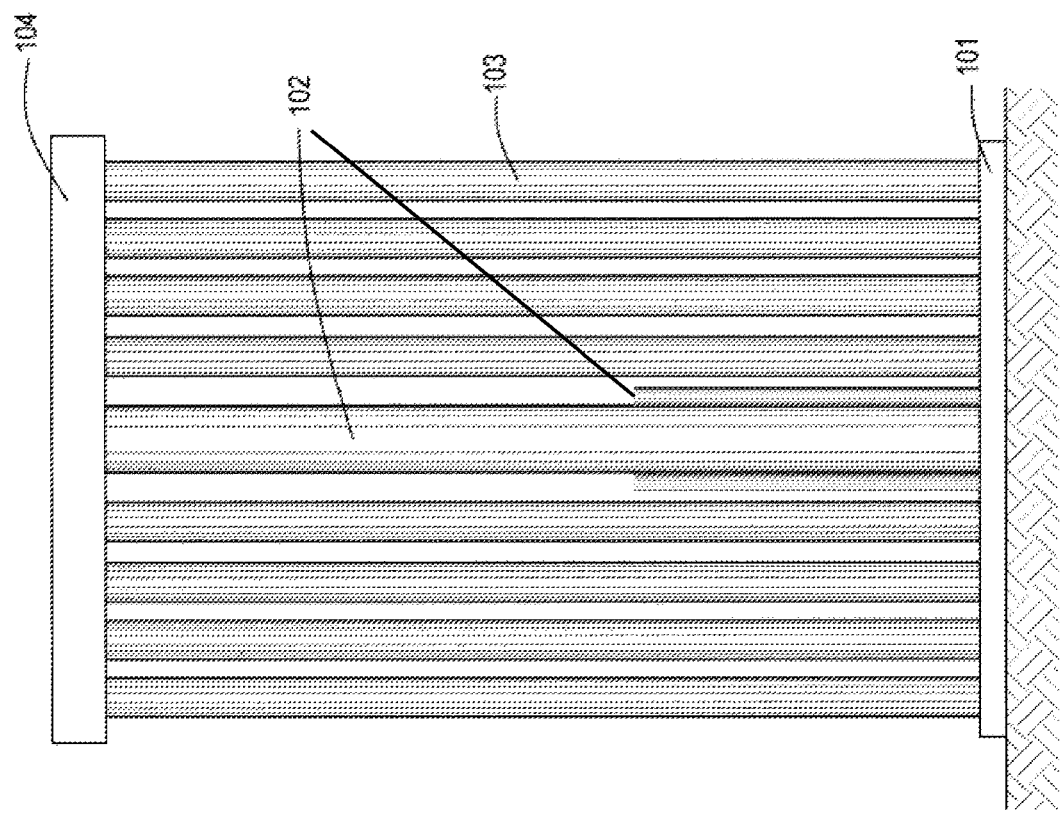
FIG. 1 illustrates an example heat conveyance system.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

There are conventional techniques for detecting heat sources, for example, the use of heat sensors, thermal imaging equipment, and the like. The problem with traditional heat detection systems is that if there are too many objects between the heat detection system and the heat producing object, the heat produced by the object may be masked and, therefore, not be displayed on the heat detection system output. In other words, if there is a fairly solid object blocking the heat producing object, the heat detection system may be unable to detect the heat producing object. For example, capturing and identifying a heat source located underground using heat detectors may be difficult because the ground masks the heat signature. Additionally, objects having similar heat signatures or that produce similar heat values will not be distinguishable on the heat detector system. Additionally, identifying a localized heat source, especially located behind another object, for example, a steel plate, underground is even more difficult using the conventional heat detection techniques because the addition of the object in conjunction with the ground blocks any heat generated by the localized heat source from the heat detection system. For example, if a person is attempting to cut through a steel plate located in the ground, conventional heat detection systems will be unable to detect the heat generated from the cutting device.

Accordingly, an embodiment provides a system and method for detecting underground heat sources by utilizing a heat conveyance module that transfers the heat generated from the underground heat source to an above ground air conveyance device. An application of such a system is, for example, as a barrier. For example, the heat conveyance module(s) may be placed or injected underground and act as a foundation that prevents a person or object from tunneling under the above ground portion of the system. The above ground portion of the system may include barrier type devices, for example, as described herein, poles, pickets, or the like. The poles or pickets include an interior space or opening. Within the interior space of the pole or picket, the system may include a tamper detection device that heats up when a person attempts to tamper with the picket, thereby producing a heat signature that is detectable utilizing heat detection equipment. The interior space of the pole or picket may additionally, or alternatively, include additional objects that make tampering with the above ground portion difficult. For example, the pole or picket may include a rod, channel, or other object that is made of a material that is difficult to tamper with, for example, difficult to cut through due to the strength of the material of the object, difficult to destroy due to the composition of the material of the object, or the like. The above ground portion may also include the air conveyance device(s) which may be the center spline or may be a portion separate from the center spline. The center spline and/or above ground portion may be designed to withstand different forces, for example, a lateral force (e.g., wind, water, etc.), a top-down force (e.g., the force required to inject the system into the ground, etc.), or the like.

The internal temperature of the air conveyance device increases due to the heat source. This increase in temperature can be captured using a heat detector or thermal imaging camera, thereby providing an indication of the underground heat source. The heat conveyance module has a box-like appearance with a top plate and two side plates. The top plate may be a beam, plate, bracket-type plate, or the like. The top plate includes an opening, which may be an opening cut into the top plate or may simply be that the top plate is shorter than the two side plates, thereby leaving a small opening when attached to the side plates.

The two side plates are mechanically attached to the top plate and extend in a downward direction from the top plate, making the sides of the box. Between the two side plates is an air gap. The heat conveyance module also includes sealing portions that are used to seal the perimeter of the side plates, except for at the top, which is sealed by the top plate, and at the opening. When heat is introduced into the air gap between the two side plates, for example, by someone cutting the side plates, heating the side plates, or the like, the heat is directed to the opening in the top plate. The side plates may also include other components that assist in aligning modules. For example, at the side of the side plates the system may include a beam, for example, an "H" shaped beam. This beam may be utilized to help guide the conveyance module into the ground and provide some structure to assist in resisting bending, torqueing, or otherwise damaging the conveyance module. Additionally, once one conveyance module is placed into the ground, the open portion of the "H" beam may be utilized to align another conveyance module with the first conveyance module. In other words, the beam may be located on just one side of the conveyance module. Once placed in the ground, the beam provides a channel for aligning a second conveyance module next to the first conveyance module.

The heat conveyance system includes at least one heat conveyance module, but generally includes two of these modules. When two modules are used in the system, the two modules are placed adjacent to each other such that the openings of both modules are proximate to each other. The heat conveyance system also includes an air conveyance device that is attached vertically with respect to the top plate of the heat conveyance modules. The air conveyance device has an internal opening, for example, like a tube, pipe, or the like, that, when attached to the modules, is located over the module openings. In other words, the internal opening of the air conveyance device covers the openings of the modules so that any heat introduced into the air gap of the modules is directed up the air conveyance device. Since the heat is directed up the air conveyance device, the temperature of the air conveyance device increases. This increase in temperature can be detected using traditional heat detecting systems, thereby allowing a user to identify that heat has been introduced into the heat conveyance module, which may indicate a localized heat source located behind the heat conveyance module, which may also be located underground. In the case of two heat conveyance modules within the heat conveyance system, the "H" beam mentioned above may be located on a side of one of the heat conveyance modules of the system. When a second heat conveyance system having two heat conveyance modules is placed next to the first system, the heat conveyance module of the second system not having the "H" beam will be aligned within the "H" beam of the first heat conveyance system.

Figure 2:
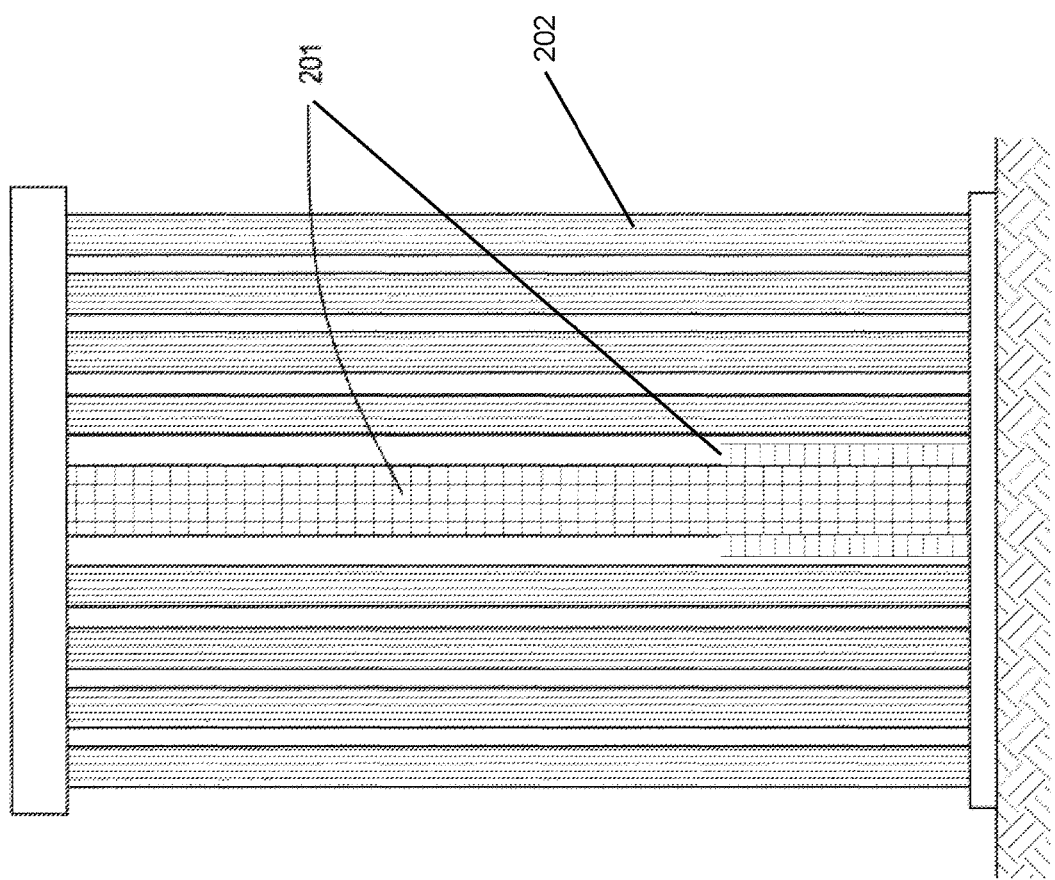
FIG. 2 illustrates an example heat conveyance system illustrating the transfer of heat from the heat conveyance module through the air conveyance device.

FIG. 1 illustrates an example heat conveyance system. The heat conveyance system includes heat conveyance modules 101, located underground in this figure. The heat conveyance system also includes a central air conveyance device 102. The air conveyance device 102 may alternatively be separate from the central portion. For example, the heat conveyance system may include two pipes or poles that are located next to the central portion that act as the air conveyance devices. Both of these alternatives, as a central device and as separate devices, are illustrated in FIG. 1 and FIG. 2. The central portion may be constructed to act as an insertion mechanism. In other words, the central portion may be constructed in such a way as to allow for a force at the top of the central portion to push down on the central portion in order to inject or otherwise force the heat conveyance system into the ground. Thus, the central portion may be constructed to withstand the forces that would result from this treatment, including shear forces, lateral forces, torque forces, and the like. Other portions of the heat conveyance system, for example, neighboring poles or other poles, may also be utilized for stability or to assist in overcoming the forces, when inserting the heat conveyance system.

The heat conveyance system also includes a plurality of additional poles, pickets, tubes, or the like 103. The term poles will be used here throughout to increase readability. However, it should be understood that these may be cylindrical, square, triangular, or any other shape. Additionally, these may be solid, hollow, partially solid, or the like. The poles may be attached to the heat conveyance system in a manner that allows for movement of the poles on the heat conveyance system when the system is placed. For example, if the poles are square, the tubes may be turned at a 45 degree angle with respect to the face of the heat conveyance system. In other words, from a top view, the poles, rather than a side of the pole being parallel with the front of the top portion of the heat conveyance system, would be turned making the poles look like diamonds instead of squares with respect to the front or back of the top portion of the heat conveyance system. As a further illustration, if a person is looking at the heat conveyance system from a front or back view, the person would see the corner of the poles rather than a face of the poles. By turning the poles, the heat conveyance system can flex without causing the poles to break or shear, which may occur if the poles are not turned with respect to the face of the heat conveyance system.

The heat generated from a heat-generating source may be conveyed through these poles in addition to or separate from the air conveyance device within or next to the central portion. The poles 103 may be fully or partially filled with steel, concrete, or another substance. The poles may, additionally or alternatively, be filled, or partially filled, with a tamper detection device. The tamper detection device may be made of a tar material that, when heated, becomes gummy. Additionally, the tar material may also cause lots of smoke when heated. This is particularly useful if someone attempts to cut-through the tamper detection device as the material will adhere to and possibly disable the device used to cut through the tamper detection device and will also generate heat and smoke which can be detected. When cool, or not heated, the tamper detection device may be solid or semi-solid and able to be touched and handled by a person. The tamper detection device may include an outer layer that allows for the handling of the tamper detection device. For example, the outer layer may be made of a paper, wax paper, aluminum, or other type of lightweight material that can be wrapped around the inner layer that is made of the tar material.

When the tamper detection device is placed within the pole, the tamper detection device may touch the top plate of the heat conveyance module. The tamper detection device may be of a length that prevents a person from circumventing the tamper detection device, for example, between two and ten feet long. Such a length may prevent a person from being able to cut outside of a location of the tamper detection device. In other words, the tamper detection device may be long enough that a person standing on the ground or utilizing a standard length ladder cannot cut above the tamper detection device, and, thereby, circumvent the tamper detection device. When a person attempts to cut through, or otherwise tamper with the poles, and, therefore, the tamper detection device, the tamper detection device not only becomes gummy and possibly disable the device being utilized to tamper with the poles, but also heats up. Upon heating up, the tamper detection device creates heat that results in a heat signature that is of a higher temperature than the surrounding environment. This heat signature can then be detected utilizing heat detection equipment or systems. Additionally, since a single pole will have the increased heat signature, a person utilizing the heat detection system can identify which pole is being tampered with.

Additionally, the pole may include an additional object that may make tampering with the pole difficult. For example, the pole may include a rod, channel, or other object, that is made of a material that is difficult to cut through, for example, steel or another material. The rod may be made of a material that is difficult to cut through or destroy due to the material or composition of the rod. This rod may be placed within the pole and, in the case that the pole includes the tamper detection device, may be placed in the center of the tamper detection device. The change of material from the steel or other material of the pole, to the gummy substance of the tamper detection device, to the steel or other hard material of the rod, makes cutting through or otherwise tampering with the pole very difficult as a single blade or other instrument is likely to be unable to cut through or tamper with all the different materials, thereby requiring multiple blades or instruments.

Figure 3:
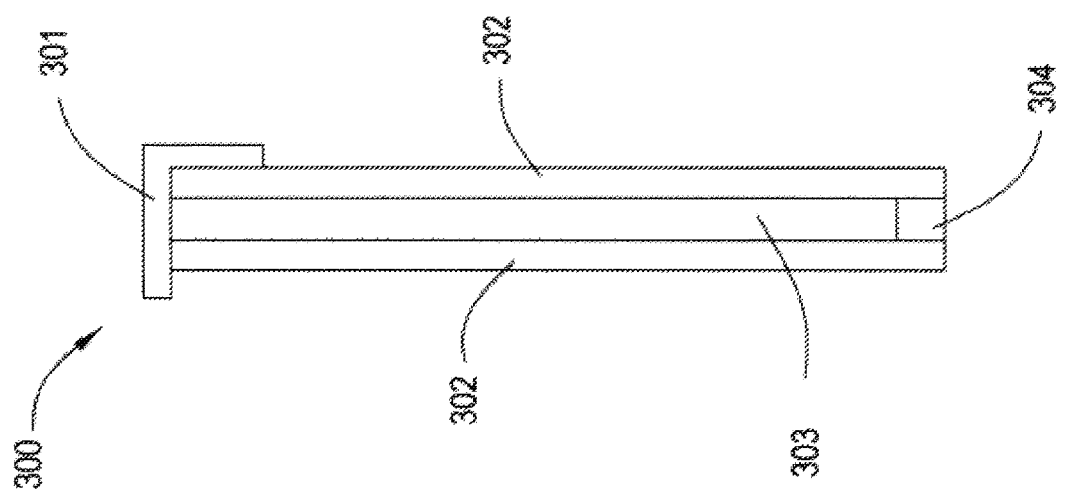
FIG. 3 illustrates a side view of an example heat conveyance module.

The heat conveyance modules are illustrated in FIG. 3, FIG. 4A, and FIG. 4B. FIG. 3 illustrates a side view of an example heat conveyance module 300. The heat conveyance module includes a top plate 301. The top plate 301 is longer than it is wide. For example, the top plate may be close to eight feet long and only four to six inches wide. In other words, the top plate is longer than it is wide. The top plate 301 may be ¼ to an inch deep or thick. It should be understood that the provided dimensions are merely illustrative and are not intended to limit the scope and spirit of the invention, as many other dimensions may be used. For example, the top plate may be shorter, wider, and thicker. The top plate may be a flat plate, beam (e.g., angle beam (as shown in FIG. 3), I-beam, channel beam, hollow beam, etc.), bracket-type plate, a flat plate with ridges, or the like.

The top plate 301 also includes an opening, not illustrated in FIG. 3. This opening may be cut, stamped, or otherwise located within the top plate. For example, the opening may be a hole located within the top plate. As another example, the opening may be a notch cut out of one end of the top plate. The dimensions of the opening may vary, but may be two to three inches square. As stated before, this dimension is merely illustrative and is non-limiting. Alternatively, the opening may not be physically located in the top plate, but, rather, may be created by the joining of the top plate with the side plates, described in more detail below. For example, the side plates may be longer than the top plate and, therefore, when joined, result in an opening being left at the end of the top plate. As a third alternative, the opening may be located below the top plate. In other words, the top plate may assist in creating the opening. In this alternative the top plate and side plates may be the same length and joined together. However, the sealing piece, described in more detail below, located on the side of the heat conveyance module may not extend from top to bottom of the side plate and may instead extend from the bottom of the side plate up towards the top plate while leaving an opening at the top adjacent to the top plate. Although the second and third alternatives for openings are not located directly in the top plate, for purposes of claim construction, these openings are considered to be included with the top plate.

The heat conveyance module also includes at least two side plates 302. For ease of readability the side plates will be referred to in a quantity of two. However, more side plates may be used, for example, three or four, that are "stacked" adjacent to each other with air gaps between. For illustrative purposes, the side plates may be eight feet long, eight feet wide, and ½ inch to a few inches thick. The side plates 302 are mechanically coupled or attached to the top plate 301 in a lengthwise direction. In other words, the length dimension of the side plate is aligned with the length dimension of the top plate. The side plates 302 are attached in a perpendicular plane with respect to the top plate 301. In other words, the side plates 302 hang down from the top plate 301 to create a front and back of a box-like structure. Thus, the side plates 302 are attached to a bottom face of the top plate 301. The side plates 302 are attached in a manner such that an air gap or space 303 exists between the two adjacent side plates 302. In the case that more than two side plates are used, the multiple side plates may be "stacked" with air gaps between each adjacent set of side plates.

The air conveyance module also includes sealing pieces 304 that are located between adjacent side plates 302. These sealing pieces act to create an air-tight or substantially air-tight seal between the side plates 302. Thus, each air conveyance module includes at least three sealing pieces, one located on the left side of the air conveyance module, one located on the right side of the air conveyance module, and one located at the bottom of the air conveyance module. While another sealing piece may be included and located at the top of the air conveyance module, this is not strictly necessary because the top plate provides the sealing of the top of the air conveyance module. The exception to the sealing of the air conveyance module is at the location of the opening. In other words, between the sealing pieces and the top plate the perimeter of the air conveyance module is sealed except for at the opening of the top plate. This design causes any heat that is introduced into the air gap or space between the side plates to be directed to the opening of the top plate.

Each of the top plate 301, side plates 302, and sealing pieces 304 may be a metal material (e.g., steel, aluminum, etc.), an alloy material (e.g., combination of metals, combination of metal and a non-metal material, etc.), a plastic material, a concrete material, or the like. The material of the plates and sealing pieces may be chosen based upon the application of the heat conveyance system. For example, a security application may utilize a stronger material. Additionally, the dimensions of each of the parts of the air conveyance module may be based upon the material that is utilized. Mechanically coupling the parts may be accomplished using any coupling technique and may be based upon the material of the parts. For example, the parts may be coupled via welding, utilizing coupling devices (e.g., rivets, bolts and nuts, etc.), utilizing adhesives, or the like.

The air conveyance module may also include an additional component, for example, an "H" beam, that may be used for aligning modules with each other. The "H" beam is located on a left or right side of the air conveyance module.

The air conveyance module may only include a single "H" beam on one side of the air conveyance module. This allows for the other side to be open and then used to align the air conveyance module with another module that is already placed and located within the ground. The beam may be utilized to help guide the conveyance module into the ground and provide some structure to assist in resisting bending, torqueing, or otherwise damaging the conveyance module. Additionally, once one conveyance module is placed into the ground, the open portion of the "H" beam may be utilized to align another conveyance module with the first conveyance module. In other words, the beam may be located on just one side of the conveyance module. Once placed in the ground, the beam provides a channel for aligning a second conveyance module next to the first conveyance module.

The heat conveyance system may include two heat conveyance modules that are connected together, for example, as shown in FIG. 4A and FIG. 4B. In the case of two heat conveyance modules within the heat conveyance system, the "H" beam mentioned above may be located on a side of one of the heat conveyance modules of the system. When a second heat conveyance system having two heat conveyance modules is placed next to the first system, the heat conveyance module of the second system not having the "H" beam will be aligned within the "H" beam of the first heat conveyance system. The heat conveyance system may include a central portion 305. This central portion 305 may be a tubular portion that has an internal diameter. Although referred to as tubular, this may also be square, triangular, or any other shape. For example, this central portion may be a square tube having six to ten inch sides. Again, these dimensions are merely illustrative and not intended to be limiting. One heat conveyance module may be attached to two opposing sides of the central portion 305 as shown in FIG. 4A which illustrates a front view of the heat conveyance system and FIG. 4B which illustrates a top view of the heat conveyance system. The central portion 305 may include an opening that corresponds to the opening of the top plate, not illustrated in FIG. 4A and FIG. 4B. In other words, the opening of the top plate may be in line with an opening in the central portion so that heat introduced into the space 303 between the side plates 302 is directed into the central portion.

FIG. 4B illustrates a different type of central portion 305 that is an I-beam. In this illustration the side plates may be attached within the cavity of the I-beam. The top plate may then not be inset into the cavity of the I-beam. Thus, the top plate opening 306 is created by the cavity of the I-beam. As an alternative, the tubular central portion may be used in conjunction with the I-beam. In this case the I-beam may be located within the tubular central portion. The I-beam may then be used as an attachment mechanism for an air conveyance device located above the heat conveyance modules.

The heat conveyance system may include at least one air conveyance device 102 that is located above the heat conveyance modules 101, as shown in FIG. 1. The air conveyance device may include an internal opening, for example, like a tube or pipe. However, the air conveyance device may be any shape having an internal opening. The air conveyance device may be coupled to the heat conveyance module(s) such that the internal opening of the air conveyance device is located over the opening of the top plate(s). In other words, the opening of the heat conveyance module(s) may be covered by the air conveyance device so that any heat introduced into the space of the heat conveyance modules is directed up the air conveyance device. In the case that the heat conveyance system includes two heat conveyance modules, the modules may be attached such that the openings of the modules are located proximate to each other. In other words, the openings of the modules may be located at or toward the central portion or the center of the heat conveyance system so that a single air conveyance device can cover both openings of the heat conveyance modules.

The air conveyance device is attached vertically with respect to the top plate of the heat conveyance device. In other words, the air conveyance device sticks up above the heat conveyance modules. To attach the air conveyance device the system may include a connecting piece, for example, the I-beam or central portion may extend beyond the top plate and provide a mechanism that the air conveyance device can be placed over, thereby holding the air conveyance device. The connecting piece may have an inner open portion that is placed or located over the opening of the heat conveyance module, for example, like a nipple. The air conveyance device can then be placed over the connecting piece and mechanically coupled to the heat conveyance modules.

The heat conveyance system may also include a plurality of poles 103 that are located adjacent to the air conveyance device 102. The plurality of poles may be mechanically coupled to the top face of the top plate and in a perpendicular direction with respect to the top face of the top plate. In other words, like the air conveyance device 102, the plurality of poles 103 are vertical and stick up above the heat conveyance modules 101. The poles may be installed so that there is space between adjacent poles, as shown in FIG. 1. The heat conveyance system may also include a top cap 104 that stabilizes the air conveyance device and plurality of poles. Alternatively, the top cap 104 may be used to connect the air conveyance device and plurality of poles together.

When heat is introduced to the space between the side plates of the heat conveyance module, the heat is directed to the opening in the heat conveyance module. Since this opening is aligned with the internal opening of the air conveyance device and, if utilized, the internal opening of the connecting mechanism, the heat is directed to the air conveyance device. Then the heat is directed up the air conveyance device, thereby heating up the air conveyance device. Thus, the air conveyance device may be created from a material that conducts heat or that can heat up. Additionally, the air conveyance device may be of a color that assists in conducting heat, for example, a dark color. Since the air conveyance device heats up, this produces a different heat signature as compared to surrounding objects, for example, as shown in FIG. 2, where the air conveyance device is a different heat color 201 than heat color of the plurality of poles 202. The difference in heat of the air conveyance device can be detected using conventional heat detection systems, for example, thermal imaging cameras, heat sensors, or the like. Thus, the described heat conveyance system can be utilized to detect heat producing objects located underground and behind the heat conveyance module, for example, a person attempting to cut the side plates of the heat conveyance module.

As will be appreciated by one skilled in the art, various aspects may be embodied as a system or method. Example embodiments are described herein with reference to the figures, which illustrate example methods, devices and systems according to various example embodiments. It will be understood that actions and functionality for detecting the heat signatures may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A heat conveyance system, comprising:
at least one heat conveyance module having a three-dimensional shape with a height, width, and depth, wherein a side of the at least one heat conveyance module corresponding to the height and depth of the at least one heat conveyance module is connected to a side of a central portion having an opening and the central portion extending parallel to the side of the at least one heat conveyance module to at least to a top side of the at least one heat conveyance module;
the at least one heat conveyance module comprising:
a top plate corresponding to the top side of the at least one heat conveyance module and having a length dimension and a width dimension, wherein the length dimension is greater than the width dimension, the length dimension of the top plate being shorter than the width of the at least one heat conveyance module creating an opening in the at least one heat conveyance module, wherein the location of the opening in the at least one heat conveyance module corresponds to the opening in the central portion;
at least two side plates each corresponding to the height and width of the at least one heat conveyance module, wherein each of the at least two side plates is mechanically coupled to a bottom face of the top plate in a lengthwise direction and wherein, when mechanically coupled, the at least two side plates are in a perpendicular direction with respect to the top plate and have a space between the at least two side plates, wherein heat introduced into the space between the at least two side plates is directed into the opening of the at least one heat conveyance module; and
at least three sealing pieces located between and mechanically coupled to two adjacent side plates of the at least two side plates, wherein one of the at least three sealing pieces is located at a left side of the adjacent side plates, one of the at least three sealing pieces is located at a right side of the adjacent side plates, and one of the at least three sealing pieces is located at a bottom side of the adjacent side plates;
at least one pole coupled to the at least one heat conveyance module, the at least one pole having an interior opening, wherein the lengthwise dimension of the at least one pole is perpendicular to the lengthwise dimension of the top plate; and
at least one tamper detection device placed within the interior opening of the at least one pole, wherein the at least one tamper detection device comprises an outer layer surrounding an interior layer, wherein the outer layer comprises a material wrapped around the interior layer material and wherein the interior layer comprises a tar material that, when heated, becomes gummy and causes smoke.

2. The heat conveyance system of claim 1, wherein the at least one tamper detection device, when placed within the interior opening, is located at a location within the at least one pole to touch the at least one heat conveyance device.

3. The heat conveyance system of claim 1, wherein the at least one tamper detection device has a lengthwise dimension between two and ten feet.

4. The heat conveyance system of claim 1, further comprising at least one air conveyance device coupled to the at least one heat conveyance module and located such that the inner opening of the at least one air conveyance device covers the opening in the at least one heat conveyance module.

5. The heat conveyance system of claim 1, comprising two heat conveyance modules, wherein the two heat conveyance modules are adjacent to each other with respect to the width dimension of the top plate such that the opening of one of the two heat conveyance modules is located proximate to the opening of the other of the two heat conveyance modules.

6. The heat conveyance system of claim 5, further comprising at least one air conveyance device coupled to both of the two heat conveyance modules such that the inner opening of the at least one air conveyance device covers the opening of both of the two heat conveyance modules.

7. The heat conveyance system of claim 1, wherein the top plate comprises an L-shaped plate.

8. A heat conveyance module having a three-dimensional shape with a height, width, and depth, comprising:
a top plate corresponding to a top side of the heat conveyance module and having a length dimension and a width dimension, wherein the length dimension is greater than the width dimension, the length dimension of the top plate being shorter than the width of the heat conveyance module creating an opening in the heat conveyance module, wherein the location of the opening in the heat conveyance module corresponds to an opening in a central portion adjacent to a side of the heat conveyance module corresponding to the height and depth of the heat conveyance module, the central portion extending parallel to the side of the heat conveyance module to at least a the top side of the heat conveyance module;
at least two side plates each corresponding to the height and width of the heat conveyance module, wherein each of the at least two side plates is mechanically coupled to a bottom face of the top plate in a lengthwise direction and wherein, when mechanically coupled, the at least two side plates are in a perpendicular direction with respect to the top plate and have a space between the at least two side plates, wherein heat introduced into the space between the at least two side plates is directed into the opening of the heat conveyance module;

at least three sealing pieces located between and mechanically coupled to two adjacent side plates of the at least two side plates, wherein one of the at least three sealing pieces is located at a left side of the adjacent side plates, one of the at least three sealing pieces is located at a right side of the adjacent side plates, and one of the at least three sealing pieces is located at a bottom side of the adjacent side plates;

at least one pole coupled to the top plate, the at least one pole having an interior opening, wherein the lengthwise dimension of the at least one pole is perpendicular to the lengthwise dimension of the top plate; and at least one tamper detection device placed within the interior opening of the at least one pole, wherein the at least one tamper detection device comprises an outer layer surrounding an interior layer, wherein the outer layer comprises a material wrapped around the interior layer material and wherein the interior layer comprises a tar material that, when heated, becomes gummy and causes smoke.

9. The heat conveyance module of claim 8, wherein the at least one tamper detection device, when placed within the interior opening, is located at a location within the at least one pole to touch the heat conveyance module device.

10. The heat conveyance module of claim 8, wherein the at least one tamper detection device has a lengthwise dimension between two and ten feet.

11. The heat conveyance module of claim 8, further comprising at least one air conveyance device coupled to a top face of the top plate and located such that the inner opening of the at least one air conveyance device covers the opening in the heat conveyance module.

12. A heat conveyance system, comprising:
two heat conveyance modules, each heat conveyance module having a three-dimensional shape with a height, width, and depth, and each comprising:
  a top plate corresponding to a top side of the heat conveyance module and having a length dimension and a width dimension, wherein the length dimension is greater than the width dimension, the length dimension of the top plate being shorter than the width of the heat conveyance module creating an opening in the heat conveyance module;
  at least two side plates each corresponding to the height and width of the heat conveyance module, wherein each of the at least two side plates is mechanically coupled to a bottom face of the top plate in a lengthwise direction and wherein, when mechanically coupled, the at least two side plates are in a perpendicular direction with respect to the top plate and have a space between the at least two side plates, wherein heat introduced into the space between the at least two side plates is directed into the opening in the heat conveyance module; and
  at least three sealing pieces located between and mechanically coupled to two adjacent side plates of the at least two side plates, wherein one of the at least three sealing pieces is located at a left side of the adjacent side plates, one of the at least three sealing pieces is located at a right side of the adjacent side plates, and one of the at least three sealing pieces is located at a bottom side of the adjacent side plates;
  the at least three sealing pieces and the top plate act to seal the outer perimeter of the at least two side plates such that heat introduced into the space between the at least two side plates is directed to the opening of the top plate; and
a central portion extending parallel to a side, corresponding to the height and depth of a corresponding heat conveyance module, of each of the two heat conveyance modules to at least the top side of the two heat conveyance modules;
wherein the side of each of the two heat conveyance modules is connected on opposite sides of the central portion and such that the opening of each of the two heat conveyance modules corresponds to an opening of the central portion;
at least one air conveyance device coupled to a top face of both of the top plates of the two heat conveyance modules such that the inner opening of the air conveyance device covers the opening of both of the heat conveyance modules and the length of the at least one air conveyance device being in a perpendicular direction with respect to the top face of the top plates;
a plurality of poles mechanically coupled to the top face of the top plate of each of the heat conveyance modules, the length of the plurality of poles being in a perpendicular direction with respect to the top face of the top plate; and
at least one tamper detection device placed within the interior opening of each of the plurality of poles, wherein the at least one tamper detection device comprises an outer layer surrounding an interior layer, wherein the outer layer comprises a flexible material wrapped around the interior layer and wherein the interior layer comprises a tar material that, when heated, becomes gummy and causes smoke.

13. The heat conveyance system of claim 12, wherein the at least one tamper detection device, when placed within the interior opening, is located at a location within the at least one pole to touch one of the two heat conveyance modules device.

14. The heat conveyance system of claim 12, wherein the at least one tamper detection device has a lengthwise dimension between two and ten feet.

* * * * *